(12) United States Patent
Erickson et al.

(10) Patent No.: US 11,904,537 B2
(45) Date of Patent: *Feb. 20, 2024

(54) 3D FORMING OBJECTS USING HIGH MELTING TEMPERATURE POLYMERS

(71) Applicant: HEWLETT-PACKARD DEVELOPMENT COMPANY, L.P., Spring, TX (US)

(72) Inventors: Kristopher J. Erickson, Palo Alto, CA (US); Lihua Zhao, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,197

(22) Filed: May 25, 2022

(65) Prior Publication Data

US 2022/0281165 A1    Sep. 8, 2022

Related U.S. Application Data

(62) Division of application No. 16/076,338, filed as application No. PCT/US2017/028951 on Apr. 21, 2017, now Pat. No. 11,413,815.

(51) Int. Cl.
*B29C 64/165* (2017.01)
*B29C 64/295* (2017.01)
(Continued)

(52) U.S. Cl.
CPC .......... *B29C 64/165* (2017.08); *B29C 64/209* (2017.08); *B29C 64/268* (2017.08);
(Continued)

(58) Field of Classification Search
CPC ... B29C 64/165; B29C 64/268; B29C 64/336; B33Y 30/00; B33Y 70/00
See application file for complete search history.

(56) References Cited

U.S. PATENT DOCUMENTS

| 6,019,814 A | 2/2000 | Horine |
| 2007/0241482 A1 | 10/2007 | Giller et al. |

(Continued)

FOREIGN PATENT DOCUMENTS

| CN | 105246644 A | 1/2016 |
| EP | 1262305 A2 | 12/2002 |

(Continued)

OTHER PUBLICATIONS

Xiaoyong, S., et al., "Experimental Analysis of High Temperature PEEK Materials on 3D Printing Test," 2017 9th International Conference on Measuring Technology and Mechatronics Automation (ICMTMA), 2017, pp. 13-16.

*Primary Examiner* — Joseph S Del Sole
*Assistant Examiner* — Mohamed K Ahmed Ali
(74) *Attorney, Agent, or Firm* — SHOOK, HARDY & BACON L.L.P.

(57) ABSTRACT

A system for forming a multiple layer object, the system including: a spreader to form a layer of polymer particles, the polymer particles having a melting temperature (Tm) of at least 250° C.; a fluid ejection head to selectively deposit a first fusing agent on a first portion of the layer and selectively deposit a second fusing agent on a second portion of the layer, wherein the fluid ejection head does not deposit the fusing agent on a third portion of the layer; and a heat source to heat the first portion and second portion, wherein the first portion is part of the multiple layer object and the second portion is not part of the multiple layer object and the second portion raises a temperature of polymer particles in a subsequent layer.

20 Claims, 4 Drawing Sheets

(51) Int. Cl.
  *B29C 64/209*      (2017.01)
  *B29C 64/268*      (2017.01)
  *B33Y 10/00*       (2015.01)
  *B33Y 70/00*       (2020.01)
  *B33Y 30/00*       (2015.01)

(52) U.S. Cl.
  CPC ............ *B29C 64/295* (2017.08); *B33Y 70/00* (2014.12); *B33Y 10/00* (2014.12); *B33Y 30/00* (2014.12)

(56) References Cited

U.S. PATENT DOCUMENTS

| | | |
|---|---|---|
| 2010/0028645 A1 | 2/2010 | Maguire et al. |
| 2015/0210016 A1 | 7/2015 | Okamoto |
| 2016/0167089 A1 | 6/2016 | Ng et al. |
| 2016/0298220 A1 | 10/2016 | Bruck et al. |

FOREIGN PATENT DOCUMENTS

| | | |
|---|---|---|
| EP | 3094472 A1 | 11/2016 |
| JP | 09-207228 A | 8/1997 |
| WO | 2015/106836 A1 | 7/2015 |
| WO | 2015/106840 A1 | 7/2015 |
| WO | 2015/167530 A2 | 11/2015 |
| WO | 2016/053245 A1 | 4/2016 |
| WO | 2016/053248 A1 | 4/2016 |
| WO | 2016/068899 A1 | 5/2016 |
| WO | 2016/080993 A1 | 5/2016 |
| WO | 2016/115046 A1 | 7/2016 |
| WO | 2016/140670 A1 | 9/2016 |
| WO | 2016/175813 A1 | 11/2016 |
| WO | 2016/195665 A1 | 12/2016 |
| WO | 2017/014785 A1 | 1/2017 |
| WO | 2017/019088 A1 | 2/2017 |

3D FORMING OBJECTS USING HIGH MELTING TEMPERATURE POLYMERS

BACKGROUND

Historically, metal parts, generally machined and/or cast, were used for components in mechanically demanding applications. Machining tended to be the most expensive due to the cost of a skilled machinist. However, machining was also highly flexible and capable of tight tolerances that were difficult to achieve by other methods. The development of automated and semi-automated machining techniques has reduced the touch time (the time a machinist was operating a system) and the cost of machining parts. Swiss machines (historically) and Computer Numerical Control (CNC) have seen increasing adoption as they have been able to automate increasingly complex machining tasks, with a reduction in per part machinist time. However, other technologies have emerged that also have threatened the supremacy of machined metal parts.

Three dimensional printing (forming) of objects is a developing technology that uses ejectors and/or material to assemble objects. While machining starts with a block of material and removes material until the object is formed, three dimensional printing, in contrast, builds the part up bit by bit until the object is formed. Early three dimensional printing used ejected fluid to provide all of the mass of the developing part. Other methods have used incorporated particles and/or solid material to provide much of the mass of the formed object. Not providing all the material through an ejected fluid has increased the speed and reduced the cost of three dimensional printing. Three dimensional printing continues to be a developing technology that is approaching competitiveness with traditional methods.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Three dimensional printing has been able to produce figures using polymers. These figures often lack mechanical strength due to the polymers used. In some cases, figures have been produced using three dimensional printing and then used to cast metal parts, for example using a lost wax process. This has sometimes been more cost effective than machining parts but overall the increased number of operations and different technologies (printing and casting) used have slowed adoption of this approach.

Material science has also provided a solution in the form of new, high melting temperature polymers. High melting temperature polymers ("HTPs"), also called structural polymers and/or engineering polymers, have high mechanical strengths, often on the order of metal parts formed from aluminum or low grade steel, low creep, and high stiffness. For purposes of this specification, HTPs are polymers with melting temperatures of at least 250 degrees C. HTPs may have less ductility than traditional metal parts and their creep strength is generally lower. However, unlike metals, HTPs may be molded. Molding of formerly metal components from HTPs has allowed cost savings over machined components in many designs. Molding offers low per piece cost, very tight tolerances, high reproducibility with low part to part variation, excellent throughput, and other advantages over machined metal parts. However, molding HTPs is difficult, in part because of the high temperature used to melt the HTP for molding, the higher viscosities and pressures involved, etc. Nevertheless, molded HTP parts have seen increasing use in mechanically demanding applications.

Molding High melting Temperature Polymers ("HTPs") uses molds, generally either aluminum or steel. Preparing molds, molding parts, adjusting the molds, and molding additional parts in order to produce a desired part can be time consuming and expensive. This may make molding impractical when a design is not yet fixed for the part. Often this has meant the use of either machined metal parts and/or machined HTP parts for small batch and/or prototyping applications. This avoids the time and cost of mold development while the part design is being finalized but still has high machining costs and substantial material waste.

Developing the ability to form 3D printed parts from high melting temperature polymers would provide 3D printed parts with greater strength and toughness than other 3D printed polymers. 3D printing is a technology that is well suited to small runs of parts and for development/design testing, including forming min spec and max spec testing for validation studies, etc. Such parts reduce product development cycle times, reduce costs, and/or decrease project risk.

Printing three dimensional parts from HTPs has additional challenges compared with printing lower melt temperature polymers. For example, the higher melting temperatures of the polymers can be damaging to the components of the system. This may include the bed and spreader. This may include the fluid ejection head. Reaching higher temperatures implies greater energy input into the part. Greater temperatures also produce greater temperature differentials and greater thermal stresses. Control may become more challenging due to the greater heat flux into, within, and out of the system. The fluid ejection head may experience greater wear, greater material accumulation in the nozzles and surface of the fluid ejection head. The higher temperatures and greater heat flux may impact the stability of fluid in the fluid ejection head.

The interaction between a deposited fusing and/or masking agent and the system becomes more challenging when dealing with high melting temperature polymers. Fluid ejection heads may use a solvent, for example, water, to convey the material to the surface. The solvent then evaporates and leaves the material behind on the surface. In a thermal inkjet (TIJ), a heater forms a gas bubble by evaporating the solvent, the gas bubble then pushes the fluid droplet out of the fluid ejection head toward the target. The drying time of the solvent on a surface may be modified by heating and/or cooling. The drying time may also be modified by use a more volatile solvent and/or solvents. The drying time may be extended by adding a humectant, such as glycerol.

When depositing a fusing agent onto a surface of high melting temperature polymer particles, some additional challenges become apparent. The droplet containing the fusing agent contains liquid, for example water, that makes thermal inkjet ejector function. However, the polymer particles contacted by the droplet are at a temperature well above the boiling point of the liquid. This may result in the droplet scattering upon impact as the liquid turns to vapor. However, it has been found that, if the temperature of the polymer particles is increased further, a stable regime is reached where the polymer particles hold together and deposition of the fusing agent can be accomplished.

Another novel element is using a colder forming environment and heating portions of the top layer of polymer particles. This allows the use of less expensive materials for the system components. The polymer functions as an insulator, allowing a thermal gradient to be maintained between the newly consolidated portion in the top layer of the accumulating part and the environment. In order for this to work, the process of applying a layer, patterning with the fusing agent, and exposing to the radiation (heat) source needs to be accomplished relatively quickly. Otherwise, the heat loss is greater and the consolidated areas may drop below the solidification temperature. Solidification may introduce warping and buckling making applying additional layers more difficult. Warping and buckling are disruptive to automated and semi-automated methods of layer formation.

One way to slow the cooling of the top layer of polymer particles is to form areas in the layer to serve as heat reservoirs. This is done by applying fusing agent to portions of the top layer that will not be incorporated into the part. These areas may be given a lower concentration of fusing agent. Accordingly, when flood irradiation is applied, the heat reservoirs heat as well. The heat reservoirs reduce the thermal gradient between the parts of the top layer that will become the formed part and the areas that will not be part of the formed parts. Because heat transfer is dependent on the temperature difference, reducing the temperature differential reduces the flow of heat out from the formed part. In another sense, adding additional heat into the top layer in the form of heat reservoirs keeps the consolidated areas of the top layer at a higher temperature for a longer period of time. This extended time allows a new top layer to be formed before the melted polymer particles formed reach the solidification temperature. Adding the new layer on top serves to insulate and support the forming part, reducing the thermal gradients that induce warping and providing mechanical support to resist warping. This allows the forming of consolidated components made from high melting temperature polymers without raising the environment to near the polymer Tm, without heating all the new layer of polymer particulate, and/or without using components hardened to support a higher bed temperature.

Among other examples, the present specification and figures disclose a system for forming a multiple layer object, the system including: a spreader to form a layer of polymer particles, the polymer particles having a melting temperature (Tm) of at least 250° C.; a fluid ejection head to selectively deposit a first fusing agent on a first portion of the layer and selectively deposit a second fusing agent on a second portion of the layer, wherein the fluid ejection head does not deposit a fusing agent on a third portion of the layer; and a heat source to heat the first portion and second portion, wherein the first portion is part of the multiple layer object and the second portion is not part of the multiple layer object and the second portion raises a temperature of polymer particles in a subsequent layer.

This specification also discusses, a system including: a spreader to form layers of polymer particles, the polymer particles having a melting temperature (Tm) of at least 250° C.; a fluid ejection head to selectively deposit a fusing agent on a top layer of the layers of polymer particles; a bed heater to heat a working area of the system to no more than 10 degrees centigrade below the Tm of the polymer particles; and a radiation source to selectively heat the top layer, wherein spreading a new layer on top of the layers of polymer particulate, applying the fusing agent to the new layer, and heating the new layer with the radiation source are accomplished such that the temperature of the top layer remains above a solidification temperature (Ts) of the polymer particles until the top layer is covered by the new layer.

This specification also discusses a method, the method including: in a bed area of a first temperature, heating a top layer of polymer particles of a multiple layer assembly to between a second temperature and a third temperature; and while a top surface of the top layer is between the second temperature and the third temperature, selectively applying a fusing agent to the top surface of the top layer using a fluid ejection head; wherein the third temperature a melting temperature (Tm) of the polymer particles as determined by differential scanning calorimetry (DSC) as a largest point of a melting peak, the second temperature is a temperature wherein the polymer particles become tacky such that deposited agent does not displace the particles, and the first temperature is at least 50 degrees centigrade below Tm.

As used in the present specification and the appended claims, the term melting temperature (Tm) is defined by the largest melting peak in a differential scanning calorimetry scan of the relevant polymer. Because of the high thermal gradients, small scale, and factors, the effective Tm may differ from a steady state, and/or slow scan speed melting temperature. Similarly, the solidification temperature (Ts) is the largest solidification peak when cooling the polymer. In high melting temperature polymers, it is not uncommon for the melting temperature (Tm) and the solidification temperature (Ts) to be separated with a working area in between where the material may be solid and/or liquid depending on the processing history. The keeping the formed portion of the component between Tm and Ts may reduce stresses in the formed part. Slowing the transition through the Ts may reduce the stresses locked into the solidified component. A potentially useful analogy is quenching vs. annealing in metal parts where a slower transition with smaller thermal gradients allows more time for the system to relieve stress, although clearly the mechanisms are quite different.

As used in this specification and the associated claims, the term "bed temperature" refers to the temperature of the particulate in the particulate layers that are not preferentially heated by energy absorbed by the fusing agent. These exclude the heat reservoir(s) and the consolidated portion(s) of the particulate layer. The ability to provide a gradient between the bed temperature and the consolidated areas allows the use of lower cost, more temperature sensitive components. It is facilitated by the use of a rapid layer forming, patterning, and heating cycle, for example, a rapid cycle associated with a multiple jet fusion process.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Figure 1:
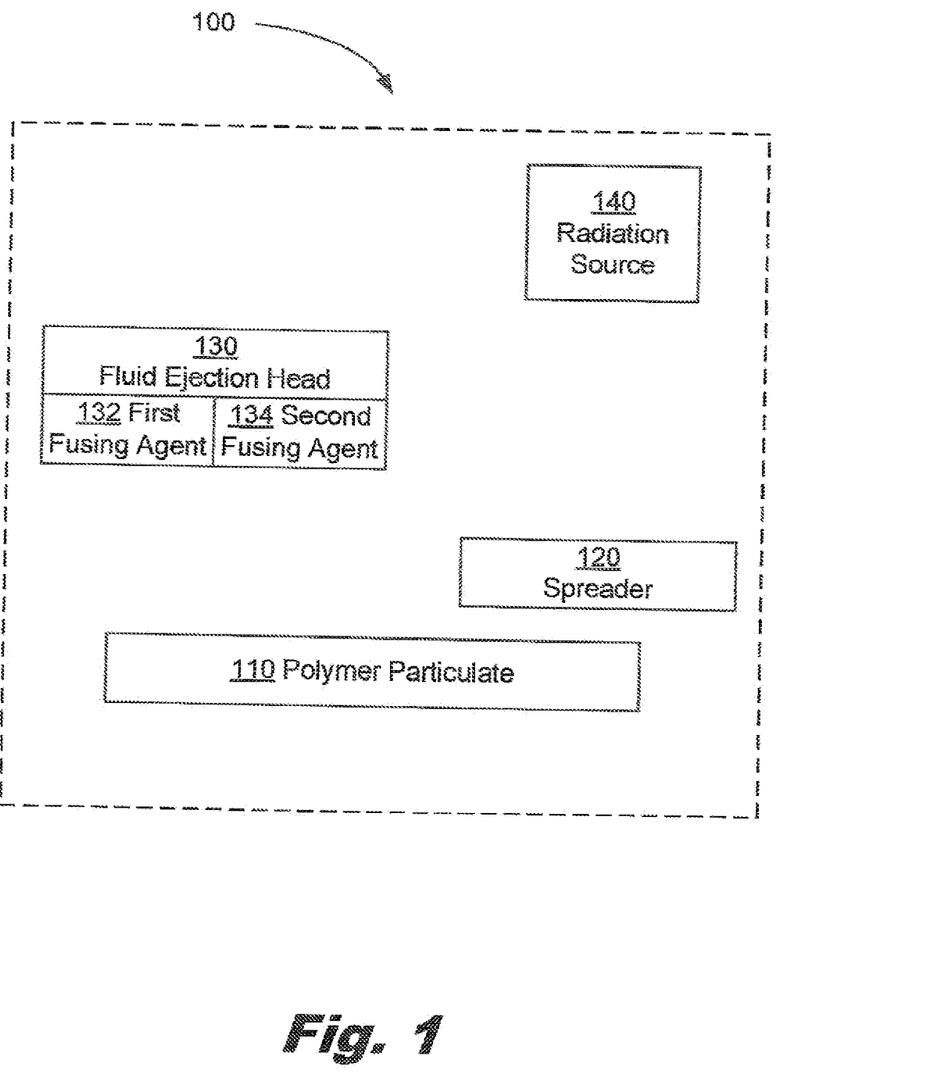
FIG. 1 is a diagram of a system for forming a multiple layer object from a high melting temperature polymer according to an example of the principles described herein.

Turning now to the figures, FIG. 1 is a diagram of a system (100) for forming a multiple layer object from a high melting temperature polymer according to an example of the principles described herein. The system (100) including: a spreader (120) to form a layer of polymer particles (110), the polymer particles (110) having a melting temperature (Tm) of at least 250° C.; a fluid ejection head (130) to selectively deposit a first fusing agent (132) on a first portion of the layer and selectively deposit a second fusing agent (134) on a second portion of the layer, wherein the fluid ejection head does not deposit a fusing agent (132, 134) on a third portion of the layer; and a heat source (140) to heat the first portion and second portion, wherein the first portion is part of the multiple layer object and the second portion is not part of the multiple layer object and the second portion raises a temperature of polymer particles (110) in a subsequent layer.

The system (100) is a system for forming a multiple layer object from a high melting temperature polymer. In this system (100), a layer of polymer particles (110) is formed and then selectively consolidated to form a layer of the object. Another layer of polymer particles (110) is applied and the process repeated. The object is built up layer by layer until the desired thickness is reached. This approach has some advantages over providing the material for the object through deposition. The use of consolidated polymer particles (110) may have higher throughput and/or quicker layer times. The use of consolidated polymer particles (110) may have thicker layers, reducing the total object forming time. The use of consolidated polymer particles (110) may make producing distributions of color, composition, strength, etc. within the formed object more difficult compared with a system where different materials are deposited to build up the component. The use of a consolidated polymer particle (110) approach also uses a spreader (120) to form the layer of polymer particles (110).

The polymer particles (110) provide the material to form the multiple layer object. The polymer particles (110) include high melting temperature polymer. High melting temperature polymers may be polymers with a melting temperature above 250° C. High melting temperature polymers may be polymers with a melting temperature above 300° C. High melting temperature polymers may be polymers with a melting temperature above 325° C. Examples of high melting temperature polymers include, but are not limited to: Fluorinated ethylene propylene (FEP, Tm of 260° C.); Perfluoroalkoxy alkane (PFA, Tm of 260° C.); Polyamide 6,6 (Nylon 6,6) (PA 6,6, Tm of 265° C.); Polyphenylene sulfide (PPS, Tm of 280° C.); Polyamide 4,6 (PA 4,6, Tm of 280° C.); Polyphthalamide (PPA, Tm of 310° C.); Liquid crystal polymer-Glass composite (e.g. Zenite) (LCP, Tm of 319° C.); Polytetrafluroethylene (PTFE, Tm of 327° C.); Polyetherketoneketone (PEKK, Tm of 337° C.); Polyether ether ketone (PEEK, Tm of 343° C.); and Polyaryletherketones (PAEK, Tm of 345° C.); and/or Liquid crystal polymers (LCP, Tm of 420° C.).

The polymer particles (110) may be of a single polymer, for example, PEEK. The polymer particles (110) may be a mixture of polymers, e.g. PA 6,6 and PA 4,6. The polymer particles (110) may be in a single distribution. The polymer particles (110) may include multiple size distributions, for example, a larger mean size distribution and a smaller mean size distribution to create a bimodal distribution. In some examples, the smaller particles are formed with a higher melting temperature (Tm) polymer. In some examples, the smaller particles are formed from a lower melting temperature polymer. The use of a bimodal size distribution may achieve higher density parts than the use of a single size distribution.

The polymer particles (110) may be mixed with other components to modify the formed multilayer object. Care and experimentation may be needed as adding additional components, e.g. a flow agent and/or a colorant, may impact the performance of the polymer particles (110). The tackiness of the polymer particles (110) is sensitive to additional components. This is consistent with a working theory that the tackiness at higher temperatures is driven by the behavior of amorphous portions of a semi crystalline high melting temperature polymer. If the crystalline portions remain intact in the tacky particles, then a very thin surface component is able to effectively interact with other particles. However, the thinness of the interacting layer may allow this behavior to be disrupted by relatively small amounts of secondary materials.

The spreader (120) is used to form a layer of polymer particles (110). The spreader (120) may include a feed to provide additional particulate to form the layer of polymer particles (110). The spreader (120) may include a vibrating component to distribute and/or compact the layer of polymer particles (110). The spreader (120) may make a single pass to form the layer of polymer particles (110). The spreader may make multiple passes to form the layer of polymer particles (110). In some examples, the subsequent passes increase the density of the layer of polymer particles (110). The spreader (120) may be automatic. The spreader (120) may be semi-automatic. The spreader (120) may be manually operated by a user.

The spreader (120) may form layers of polymer particles (110) that are of a uniform depth. The spreader may vary the depth of the formed layer of polymer particles (110) as a function of location in the part, location in the bed, and/or feature resolution. In some examples, the spreader (120) uses a first thickness for the initial layer and/or the initial few layers and then changes to a second thickness for subsequent layers.

The spreader (120) may be a roller. The roller may rotate in the direction of motion and/or opposite the direction of motion. In some examples, the roller compacts and/or increases the density of the layer of polymer particles (110). The spreader (120) may be a pusher. The spreader (120) may include a leveling blade. The spreader (120) may include multiple rollers, for example, a first roller to level and as a second roller to compact.

The spreader (120) may provide additional functionalities besides spreading of the polymer particles (110). The spreader may pattern the polymer particles (110). The spreader (120) may apply polymer particles (110). The spreader may heat and/or cool the layer of polymer particles (110). The spreader (120) may be combined with the fluid ejection head (130). In some examples, the operation of spreading and applying the first fusing agent (132) and/or the second fusing agent (134) is performed in a single pass.

The spreader (120) may include multiple particle feeds. In some examples, the spreader (120) provides a first distribution of particles for the initial layer and a second distribution of particles in subsequent layers. The spreader (120) may apply a first distribution of particles on a first pass and a second distribution of smaller particle on a second pass. The spreader (120) may apply a first distribution of smaller particles near the bottom of the layer and a second distribution including more, larger particles near the top of the layer of polymer particulate (110).

The fluid ejection head (130) ejects the first fusing agent (132) and the second fusing agent (134) onto the layer of polymer particles (110). The fluid ejection head (130) may be part of a printbar. The fluid ejection head (130) may be static and/or move relative to a forming area. The fluid ejection head (130) may include a plurality of solutions for patterning on the polymer particles (110). The fluid ejection head (130) may contain a fusing agent (132, 134). The fluid ejection head may include a masking fluid to selectively reduce absorption of the radiation from the radiation source (140).

The first fusing agent (132) increases the energy absorbed by the radiation source (140). The first fusing agent (132) may absorb a broad spectrum of electromagnetic radiation. The first fusing agent (132) may absorb a narrow wavelength of electromagnetic radiation. The first fusing agent (132) may be carried in a solvent, where the solvent acts as the propellant in the fluid ejection head. For example, the first fusing agent (132) may be in water. The first fusing agent may be mixed with a humectant, an anti-kogation agent, a detergent, an ion source, a pH modifier, a chelator, and/or combinations thereof.

The second fusing agent (134) increases the energy absorbed from the radiation source (140). The second fusing agent (134) may be the same agent as the first fusing agent (132) but at a different concentration in solution. The second fusing agent (134) may be the same formulation as the first fusing agent (132) but applied at a different density on the polymer particles (110).

The first fusing agent (132) and the second fusing agent (134) may include different materials. Fusing agents (132, 134) may include: carbon black, platinum black, titanium black, ivory black, black iron oxide, graphite, aniline black, and/or anthraquinone black. The first fusing agent (132) and second fusing agent (134) may include any near infrared absorbing dyes and/or pigments. These may include materials which strongly absorb in the infrared and/or visible regime. Some other examples include doped cesium-tungsten oxide pigments and metal dithiolene chemical dyes. Further discussion of fusing agents (132, 134) may be found in PCT/US2017/016681, "Fusing Agent including a Metal bis(Dithiolene) Complex" by Olubummo, which is incorporated by reference.

The radiation source (140) provides energy that is preferentially absorbed by the portions of the layer of polymer particles (110) that have been treated with the first fusing agent (132) and/or the second fusing agent (134). The untreated areas of the layer of polymer particles (110) may absorb energy from the radiation source (140). The untreated polymer particles (110) may absorb less than 10% of the energy of the radiation from the radiation source falling on the untreated polymer particles (110). That is to say, in some examples, more than 90% of the radiation is reflected and/or transmitted by the untreated polymer particles (110).

The radiation source (140) may be a pulsed irradiation light source. Pulsed irradiation light sources are capable of applying large amounts of light in a relatively short period of time. This makes pulsed irradiation light sources a useful energy source for high throughput operations such as three dimensional forming. Pulsed irradiation light sources may also be used in a flood mode, rather than as a point source, for example, like a laser. Irradiating the entire treatment area simultaneously provides throughput advantages as well as uniformity advantages. Simultaneous treatment of the layer of polymer particles (110) may reduce the internal stresses in the consolidated part. Simultaneous treatment may produce more uniform heating and cooling.

Pulsed irradiation light sources may be monochromatic. Pulsed irradiation light sources may have a distribution of wavelengths, including wavelengths in the infrared, visible, and/or ultraviolet frequencies. Pulsed irradiation light sources may use a light emitting diode (LED), an array of LEDs, plasmas, filaments, and/or other components to generate the electromagnetic radiation used to heat the polymer particles (110).

The radiation source (140) may provide the radiation as a single pulse. The radiation source (140) may provide the radiation as a series of pulses. The pulses may be of the same wavelength and/or energy. The pulses may vary, for example, a first type of pulse may be used to heat the polymer particles (110) and a second pulse with a different energy, wavelength, duration, frequency, spectrum, and/or other property may be used after the first pulse. The wavelength of the radiation provided by the radiation source may be selected based on a preferential absorbance frequency of the fusing agent, for example, based on a bond found in the fusing agent but not found in the polymer particles (110). Similarly, a heating pulse and/or maintenance pulse may be applied that is not dependent on the preferential absorbance of the fusing agent. Selecting a wavelength that preferentially interacts with a characteristic chemical bond in the polymer particles (110) may be useful.

Figure 2:
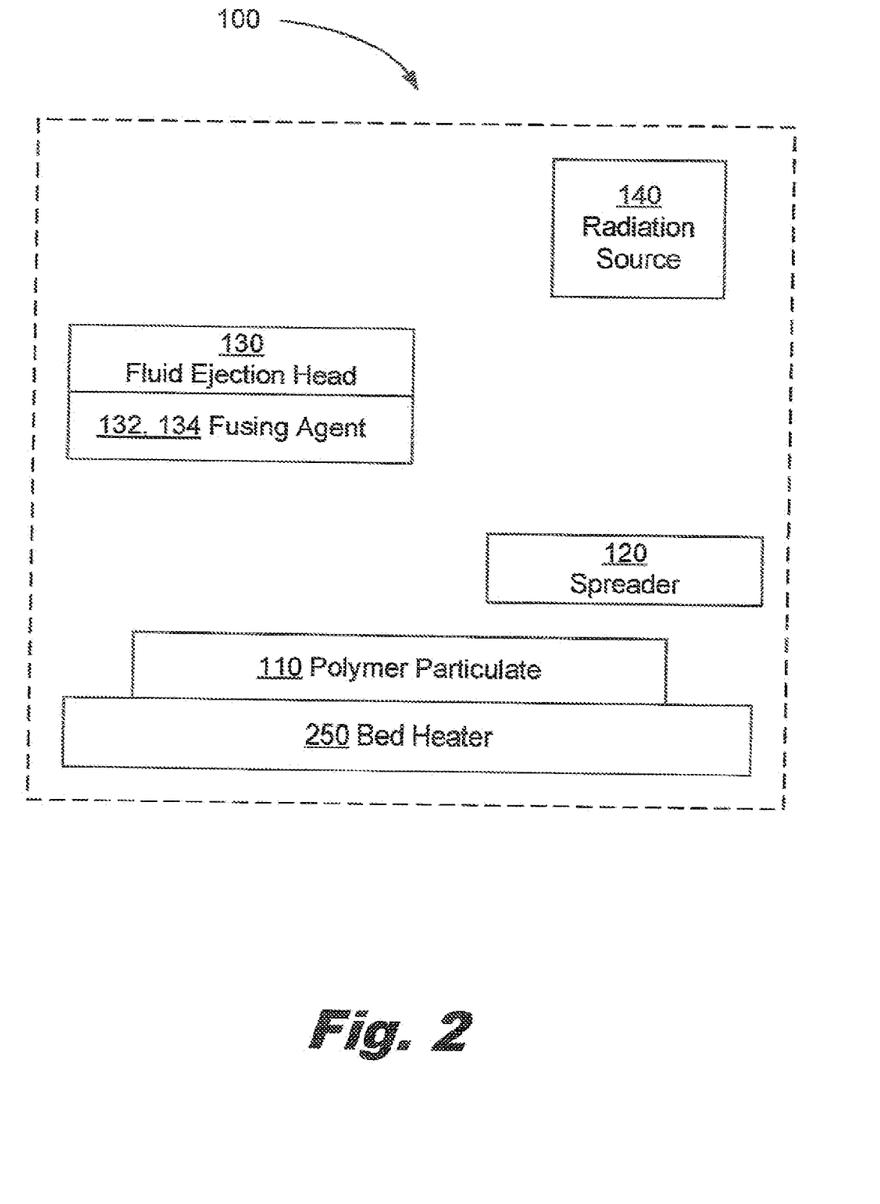
FIG. 2 is a diagram of a system according to one example consistent with the principles described herein.

FIG. 2 is a diagram of a system according to one example consistent with the present specification. The system (100) includes: a spreader (120) to form layers of polymer particles (110), the polymer particles having a melting temperature (Tm) of at least 250° C.; a fluid ejection head (130) to selectively deposit a fusing agent (132, 134) on a top layer of the layers of polymer particles (110); a bed heater (250) to heat a working area of the system to no more than 10 degrees centigrade below the Tm of the polymer particles (110); and a radiation source (140) to selectively heat the top layer of polymer particles (110), wherein spreading a new layer on top of the layers of polymer particles (110), applying the fusing agent (132, 134) to the new layer, and heating the new layer with the radiation source (140) are accomplished such that the temperature of the top layer remains above a solidification temperature (Ts) of the polymer particles (110) until the top layer is covered by the new layer.

The system (100) is a system for forming consolidated parts from polymer particles (110). The system (100) uses a fusing agent (132, 134) to selectively heat portions of a layer of polymer particles (110).

The bed heater (250) provides heat to the part forming area where the part is being fused. The bed heater (250) may include a temperature sensor. The bed heater (250) may include a controller, for example, a proportional, integral, derivative (PID) controller. The bed heater (250) may use a predefined heating profile to accommodate the dynamic process of part forming. In some examples, the predefined heating profile is refined over multiple instances of a common part design.

The bed heater (250) may include heating coils, for example, electrical resistive heating elements, steam lines, etc. The bed heater (250) may include an upper limit, for example, the bed heater (250) may be a heat exchanger where the input fluid into the heat exchanger is below to some temperature relative to the melting temperature of the polymer particles (110).

Figure 3:
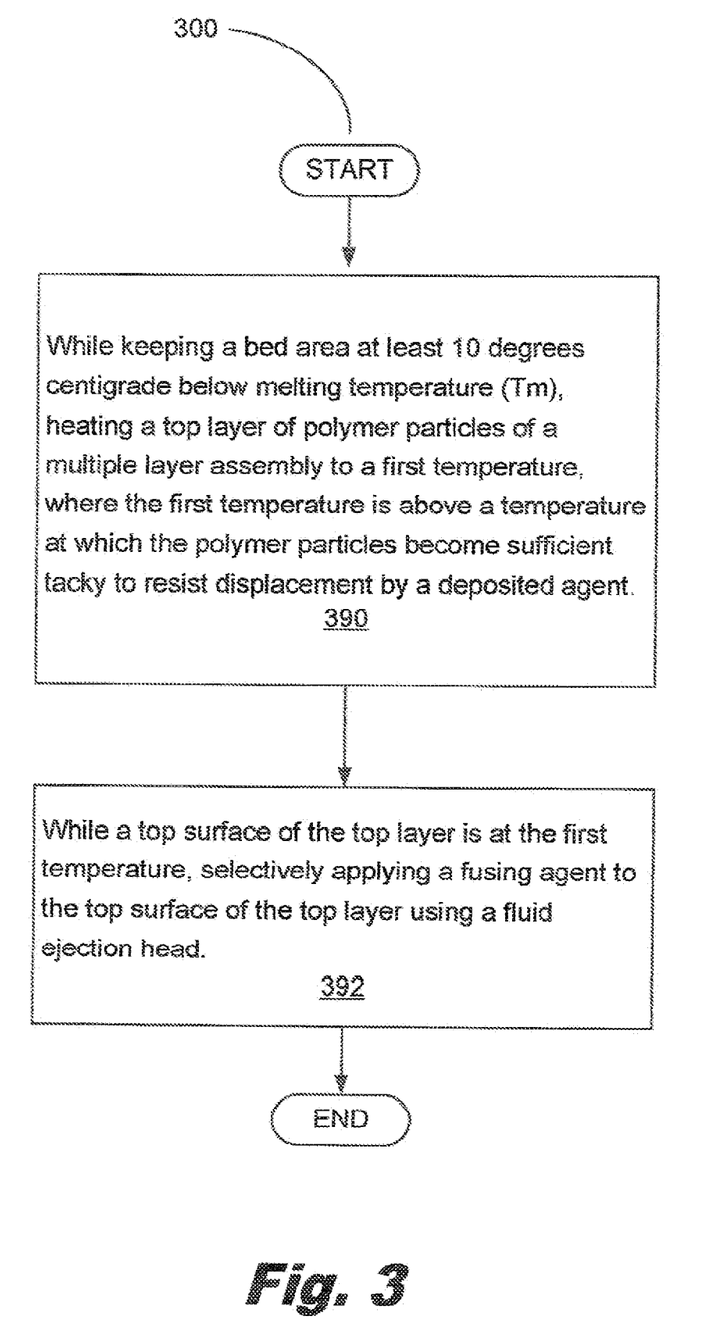
FIG. 3 is a flowchart showing a method of forming a consolidated part from high melting temperature polymer particulate according to an example of the principles described herein.

FIG. 3 shows a flowchart for a method (300) of forming a multiple layer assembly using a polymer with a melting temperature (Tm). The method (300) includes: while keeping a bed area at least 10 degrees centigrade below Tm, heating a top layer of polymer particles (110) of a multiple layer assembly to a first temperature, where the first temperature is above a temperature at which the polymer particles (110) become sufficient tacky to resist displacement by a deposited agent (390); and while a top surface of the top layer is at the first temperature, selectively applying a fusing agent (132, 134) to the top surface of the top layer using a fluid ejection head (130)(392).

The method (300) is a method (300) of forming a multiple layer assembly using a polymer with a melting temperature (Tm). The polymer particles (110) may be a semi crystalline high melting temperature polymer with a melting temperature of Tm. The Tm may be determined using the larges melting peak on a differential scanning calorimetry (DSC) measurement of the polymer particles (110).

The method (300) includes, while keeping a bed area at least 10 degrees centigrade below Tm, heating a top layer of polymer particles (110) of a multiple layer assembly to a first temperature, where the first temperature is above a temperature at which the polymer particles (110) become sufficient tacky to resist displacement by a deposited agent (390. Getting the layer of polymer particles (110) to become tacky so as to resist displacement allows patterning with the fusing agent without disrupting the layer. The presence of this tacky zone between the boiling point of the fusing agent (132, 134) solution and the melting temperature of the polymer particulate increases dimensional control of the formed object.

The method (300) includes, while a top surface of the top layer is at the first temperature, selectively applying a fusing agent (132, 134) to the top surface of the top layer using a fluid ejection head (130)(392). Selective application of the fusing agent (132, 134) enables selective heating of the areas to form the consolidated part while other areas remain at a lower, bed temperature to avoid damage to the system (100). The use of the polymer particulate to insulate the forming area and the ability to rapidly form a layer, patterning the layer, and selective heat the desired portions allow forming a consolidated part from a polymer with a high melting temperature without hardening the system. This dynamic control approach offers equipment cost and throughput advantages over systems that bring the bed to near the melting temperature of the polymer particulate (110).

At low temperatures, the deposition of fluids with onto materials is relatively straightforward. The fluid is placed in an inkjet. The inkjet activates and expels a droplet of fluid to a substrate. In a thermal inkjet (TIJ), the droplet is expelled by forming a gas bubble which expands and ejects the fluid. In a piezoelectric inkjet (PIJ) a piezoelectric actuation has a potential applied that produces a shape change that expels the droplet. The droplet lands on a substrate. Solvent in the fluid then dry and deposited material remains on the surface. In some cases, the surface is heated, for example, with a secondary heater to drive off the solvent and/or polymerize the deposited material.

However, as the surface temperature increases and passes a boiling point of the mixture, the behavior may change. When a droplet is dropped onto a surface that is higher temperature than the boiling point of the droplet, the contact with the surface may form a vapor layer that lifts and propels the droplet chaotically around the surface. A common example of this is a droplet of water on a hot pan. Thus, when the droplet lands on the layer of polymer particles (110) which are above the boiling point of the droplet, the motion of the droplet may disrupt the layer of polymer particles as the droplet darts back and forth across the surface and/or from pressure build-up from evaporating gases. Further, the final location of the fusing agent (132, 134) in the droplet is deposited at a position that is a random walk from the targeted location. This may prevent effective patterning of the fusing agent (132, 134) on the layer of polymer particles (110). Without patterning, the ability to selectively apply heat using the radiation source (140) is impaired.

With high melt temperature polymers, it has been found that once the polymer particles (110) reach a sufficiently high temperature (but still below the Tm), the polymer particles (110) become tacky. The result is that deposited droplets do not disrupt the layer of polymer particles (110) and the fusing agent (132, 134) may be effectively patterned on the polymer particles (110). While not wishing to be bound by any particular theory, it is believed that the amorphous portions of the semi crystalline polymer particles (110) are interacting and this interaction provides the tackiness between polymer particles (110) holding them together. This may occur substantially below the Tm where the crystalline portions of the polymer particles (110) are finally disrupted. In some examples, the second temperature is 70 degrees C. below Tm. In some examples, the second temperature is 50 degrees C. below Tm. The second temperature may be 30 degrees C. below Tm. The second temperature may be 20 degrees C. below Tm. Determination of the second temperature will depend on the polymer particles (110) including their composition.

Components rated to 200° C. temperatures and/or 150° C. temperatures may be produced from lower cost materials and/or methods than components that much remain functional at, for example, 300° C. Instead of hardening the system (100) with high temperature resistant, high cost components, this method localizes the high temperature operations within the bed area. This allows an operating temperature that doesn't use expensive materials in order to assure the system remains functional. The polymers and environment may be kept sufficiently insulating to preserve the temperature gradient between the first temperature and the third temperature.

In some examples, the first temperature is at least 100° C. less than Tm. In some examples, the first temperature is at least 50° C. less than Tm. In some examples, the first temperature is at least 30° C. less than Tm. In some examples, the first temperature is at least 10° C. less than Tm. In some successful experiments, the bed temperature was limited to 180° C., while the Tm of the particulate consolidated in the top layer of polymer particulate (110) was 345° C. In other testing, a bed temperature of 180° C. has been used to support a temperature of 450° C. in the areas of the polymer to be consolidated. Temperature differences of up to approximately 400° C. between the bed temperature and temperature of the consolidated polymer particulate (110) are achievable. Clearly, large temperature differences have their associated challenges. For example, the use of multiple layers of heat reservoirs and/or thicker layers including more and/or larger heat reservoirs may be needed. The greater temperature difference makes control of cooling rates more challenging. Higher temperatures in an oxygen environment (e.g. air) may result in oxidation, degradation, and/or decomposition of some polymers. The use of an inert and/or vacuum environment to reduce convection may facilitate higher temperature. In practice, a difference of 200° C. would allow forming of a variety of high melting temperature polymers, e.g. PEEK and most of the example polymers discussed above, using a bed temperature that does not have heat tolerances above 150° C. This lower bed temperature may cut the system cost compared with systems designed to support high bed temperatures. In some examples, the system may be one half to one quarter the cost of a temperature hardened system. This coupled with the throughput advantages provided by multiple jet fusion make 3D printed parts from HTPs affordable and practical for many applications that were too expensive using other methods and equipment.

The bed temperature may be limited to 120° C. The bed temperature may be limited to 150° C. The bed temperature may be limited to 180° C. Other bed temperatures may be selected depending on the temperature tolerances of the system (100) and components of the system (100) in the bed area. Temperature differences up to approximately 400° C. between the bed temperature and the peak temperature of the polymer layer (110) may be supported with proper layer patterning and diligent control. The ability to rapidly form, pattern, and heat the top layer is part of achieving larger temperature differences and avoiding excessive cooling while forming the object.

Figure 4:
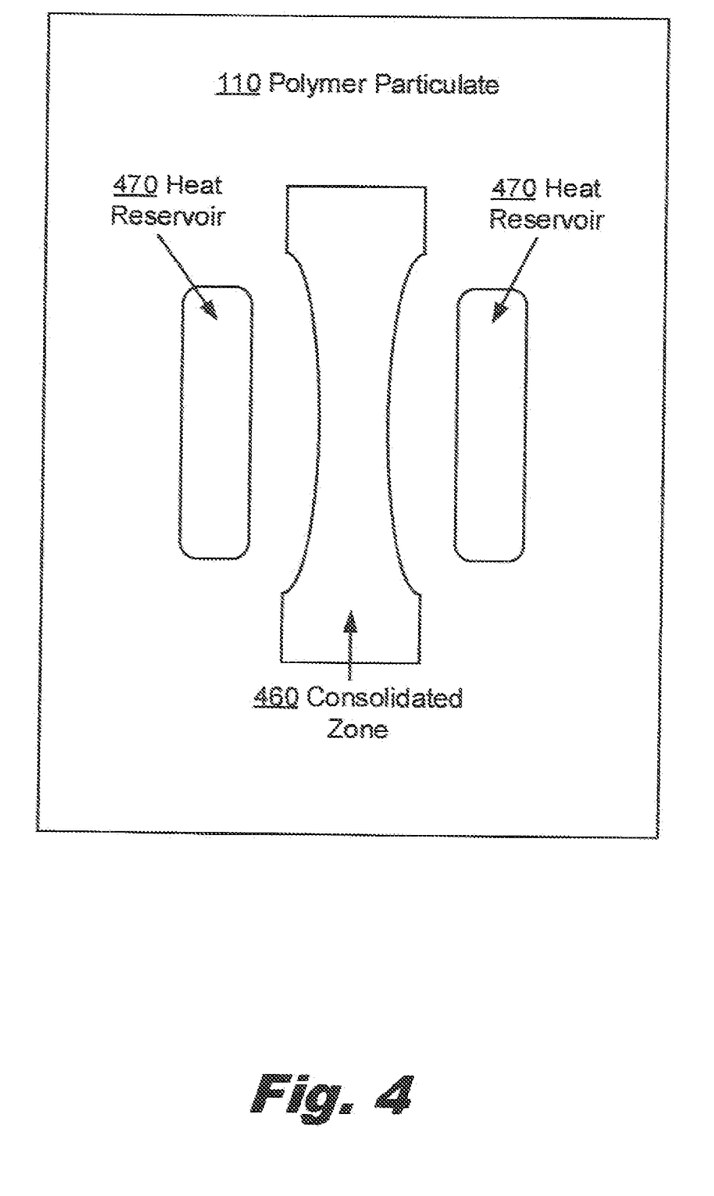
FIG. 4 shows top view of a layer of polymer particulate with both the consolidated zone that will form the part and the heat reservoirs according to one example of the principles described herein.

FIG. 4 shows top view of a layer of polymer particulate (110) with both the consolidated zone (460) that will form the part and the heat reservoirs (470) according to one example of the principles described herein.

FIG. 4 shows a consolidated zone (460) in the shape of a tensile test specimen (a.k.a. a "dogbone"). Heat reservoirs (470) are located on either side of the narrower portion of the test specimen. The addition of the heat reservoirs (470) near the narrower portion of the consolidated zone (460) helps to equalize the cooling rate of the ends of the test specimen and the center of the test specimen. The extra heat provided by the heat reservoirs (470) also slows the cooling rate of the layer overall, for example, to keep the consolidated zone (460) and/or the heat reservoirs (470) above the solidification temperature (Ts) of the polymer making up the polymer particles.

Clearly, the shown example is a very simple application of the heat reservoir (470) concept. Heat reservoirs (470) may be placed based on understanding of heat fluxes. In some examples, the system (100) providing information to the fluid ejection head (130) includes a processor that calculates the positions, size, and/or fusing agent density to control the cooling rate and uniformity of the layer of polymer particles (110) including the consolidated zone (460).

In some examples, heat reservoirs (470) are placed in different locations on adjacent layers of the multiple layers used to form the consolidated part. In some examples, heat reservoirs (470) are placed on some layers and not placed on other layers. For example, heat reservoirs (470) may be placed on every other layer, every third layer, two out of every three layers, etc. The heat reservoirs (470) may be very small, for example, as small as a single droplet of fusing agent (132, 134) applied to the layer of polymer particles (110). In some examples, a broad region of the layer of polymer particles (110) has hundreds of small and/or single droplet heat reservoirs (470). In some examples, the first layer and/or the first several layers of the multiple layers of polymer particulate (110) may include a patterning of heat reservoirs (470) without a consolidated region (460). Once a base region of suitable temperature has been formed, the consolidated region may be patterned in.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method, comprising:
    forming a layer of polymer particles, the polymer particles having a melting temperature (Tm) of at least 250° C.;
    selectively depositing a first fusing agent on a first portion of the layer;
    calculating a position, size, and density of an application of a second fusing agent which is to form a heat reservoir in the layer of polymer particles; and
    selectively depositing the second fusing agent on a second portion of the layer to form the heat reservoir, wherein a fluid ejection head does not deposit any fusing agent on a third portion of the layer; and
    heating the first portion and second portion, wherein the first portion is part of a multiple layer object to be formed and the second portion is not part of the multiple layer object, and the second portion raises a temperature of polymer particles in a subsequent layer.

2. The method of claim 1, applying the first fusing agent with a first density on the first portion of the layer and the second fusing agent with a second density on the second portion of the layer.

3. The method of claim 1, wherein the first portion of the layer has a first density of the first fusing agent at an edge of the first portion and a second density of the first fusing agent at a center of the first portion.

4. The method of claim 1, wherein the first fusing agent and the second fusing agent comprise a shared functional material.

5. The method of claim 1, wherein heating the first and second portions comprises operating a heat source that applies heat to the first portion and the second portion simultaneously.

6. The method of claim 5, wherein the heat source applies radiation uniformly to the first and second portions of the layer.

7. The method of claim 1, wherein the first portion fuses due to the heating and the second portion does not melt due to the heating.

8. The method of claim 1, further comprising, with a bed heater, heating a layer forming area of a system to no more than 10 degrees centigrade below the melting temperature of the polymer particles.

9. The method of claim 1, further comprising:
    spreading a new layer on top of the layers of polymer particles;
    applying fusing agent to the new layer; and
    heating the new layer such that a melted portion of the top layer remains above a solidification temperature (Ts) of the polymer particles until the top layer is covered by the new layer.

10. The method of claim 1, wherein a top surface of a top layer of polymer particles prior to selective application of the fusing agent has a temperature from a solidification temperature (Ts) to a melting temperature (Tm).

11. A non-transitory machine-readable storage medium encoded with instructions executable by a processor, the machine-readable storage medium comprising instructions to:
    form a layer of polymer particles, the polymer particles having a melting temperature (Tm) of at least 250° C.;

selectively deposit a first fusing agent on a first portion of the layer;

calculate a position, size, and density of an application of a second fusing agent which is to form a heat reservoir in the layer of polymer particles; and selectively deposit the second fusing agent on a second portion of the layer to form the heat reservoir, wherein a fluid ejection head does not deposit any fusing agent on a third portion of the layer; and heat the first portion and second portion, wherein the first portion is part of a multiple layer object to be formed and the second portion is not part of the multiple layer object and the second portion raises a temperature of polymer particles in a subsequent layer.

12. The non-transitory machine-readable storage medium of claim 11, further comprising instructions for applying the first fusing agent with a first density on the first portion of the layer and the second fusing agent with a second density on the second portion of the layer.

13. The non-transitory machine-readable storage medium of claim 11, wherein the first portion of the layer has a first density of the first fusing agent at an edge of the first portion and a second density of the first fusing agent at a center of the first portion.

14. The non-transitory machine-readable storage medium of claim 11, wherein the first fusing agent and the second fusing agent comprise a shared functional material.

15. The non-transitory machine-readable storage medium of claim 11, wherein heating the first and second portions comprises operating a heat source that applies heat to the first portion and the second portion simultaneously.

16. The non-transitory machine-readable storage medium of claim 15, wherein the heat source applies radiation uniformly to the first and second portions of the layer.

17. The non-transitory machine-readable storage medium of claim 11, wherein the first portion fuses due to the heating and the second portion does not melt due to the heating.

18. The non-transitory machine-readable storage medium of claim 11, further comprising instruction for, with a bed heater, heating a layer forming area of a system to no more than 10 degrees centigrade below the melting temperature of the polymer particles.

19. The non-transitory machine-readable storage medium of claim 11, further comprising instruction for:

spreading a new layer on top of the layers of polymer particles;

applying fusing agent to the new layer; and heating the new layer such that a melted portion of the top layer remains above a solidification temperature (Ts) of the polymer particles until the top layer is covered by the new layer.

20. The non-transitory machine-readable storage medium of claim 11, wherein a top surface of a top layer of polymer particles prior to selective application of the fusing agent has a temperature from a solidification temperature (Ts) to a melting temperature (Tm).

* * * * *